Jan. 6, 1925.
H. C. ZAUN
1,522,171
COOKER
Filed Oct. 30, 1922
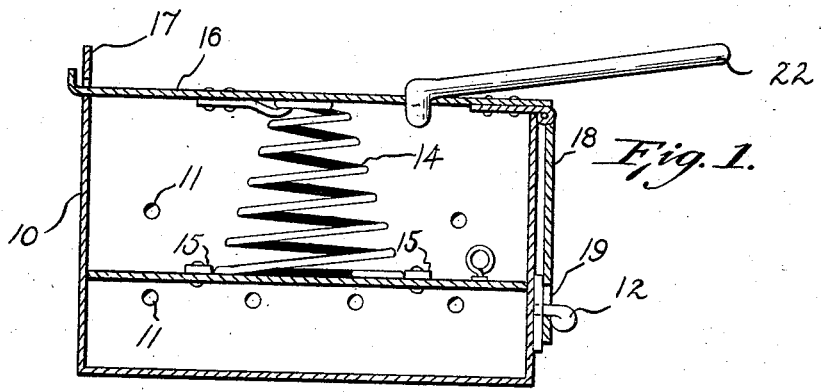
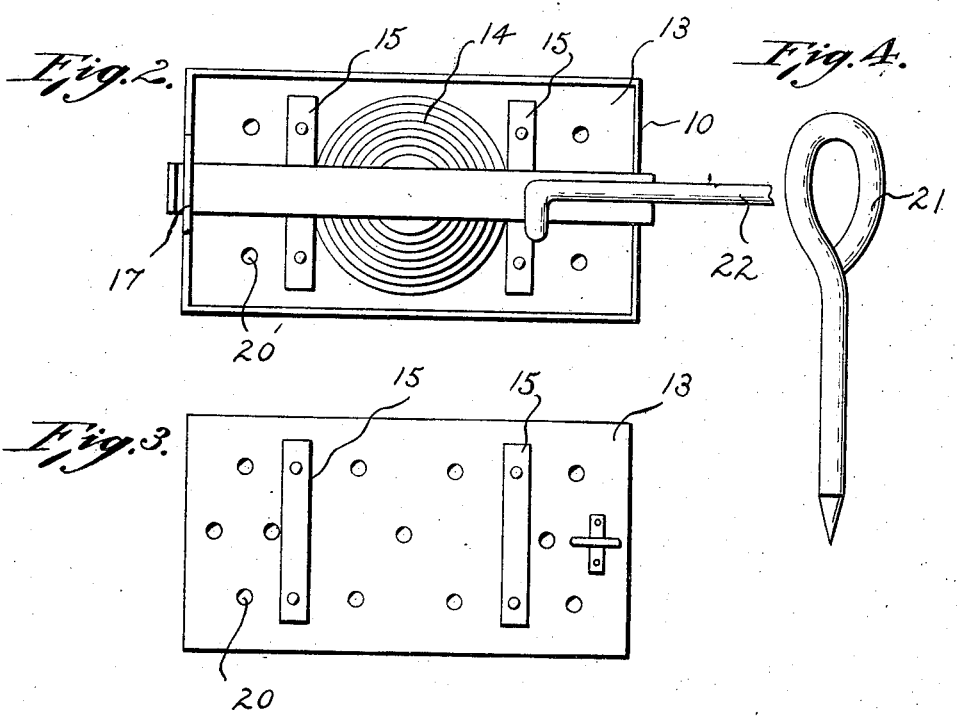
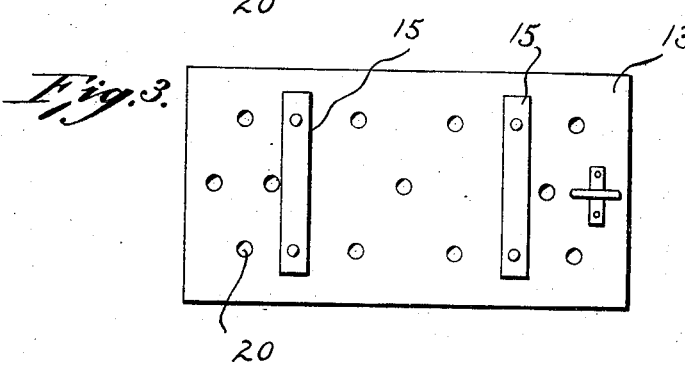
WITNESS:
F. E. Bole
Henry C. Zaun
INVENTOR
BY Victor J. Evans
ATTORNEY Patented Jan. 6, 1925.

1,522,171

UNITED STATES PATENT OFFICE.

HENRY CARL ZAUN, OF OAKLAND, CALIFORNIA.

COOKER.

Application filed October 30, 1922. Serial No. 597,939.

*To all whom it may concern:*

Be it known that I, HENRY CARL ZAUN, a citizen of United States of America, residing at Oakland, in the county of Alameda and State of California, have invented new and useful Improvements in Cookers, of which the following is a specification.

The present invention relates to a meat cooking receptacle and particularly to a ham cooker of new and novel design.

An object of the invention is to provide a cooking utensil for hams and other meats in which the contents are covered by a yieldably supported lid and through which the ham or other meat can be conveniently perforated during the cooking thereof.

As a further and additional object, the invention contemplates the provision of a ham-cooker having a yieldable lid structure capable of being readily applied to or removed from the cooker whenever required, suitable means being employed for fastening the lid to the cooker when placed thereon.

The invention further consists in the particular features of construction, and in the combination and arrangement of parts, hereinafter fully described, and illustrated in the accompanying drawing, wherein—

Figure 1 is a vertical transverse sectional view of the cooker,

Figure 2 is a plan view of the cooker,

Figure 3 is a detail view of the lid,

Figure 4 is a view of the perforating needle.

The receptacle 10 of the cooker is preferably shaped as shown in the drawing although it may be understood that it can be constructed in any manner, shape or form desired. The sides of the receptacle are provided with perforations 11 and extending from one end thereof adjacent the bottom, there is a stud 12 mounted for rotatable movement.

The lid 13 fits snugly into the receptacle and over the ham or other food contained therein, being yieldably pressed against the ham or other food by the spring 14. This spring has one end secured to the brackets 15 of the lid and the other end secured to a carrying bar 16 which extends across the upper edge of the receptacle as clearly shown in Figure 2 of the drawings.

The bar 16 is movable and has one end inserted through an extension 17 formed on one wall of the receptacle and its opposite end is provided with a hasp 18 hingedly connected thereto as shown. The lower terminal of the hasp is slotted, as at 19, to be received by the stud 12 for holding the bar down against the tension of spring 14, the elasticity of the latter, however, permitting the lid to yield to the movements of the ham as it is boiled or otherwise cooked in the receptacle.

The lid 13 is perforated as indicated at 20 and these perforations together with the perforations in the sides of the receptacle are for the purpose of perforating the ham as it is being cooked; the perforating being done by means of the needle 21 to allow shrinkage from the joint pocket of the ham.

To facilitate the handling of the lid and clamp bar, the latter is provided with a handle 22 of suitable length. This extends longitudinally of the bar and is sufficiently spaced therefrom to allow for a firm and secure grip.

From the foregoing it is thought that the novel features and advantages of the invention can be readily understood and it is to be further understood that the right is herein reserved to make such changes in the arrangement and construction of the various parts as properly come within the scope of the invention claimed.

What is claimed is:

A cooking utensil of the character described comprising a perforated receptacle, a stud projecting from one end of the receptacle, a perforated lid designed to fit within the receptacle, spaced brackets secured to the lid and having their ends terminating adjacent the side edges thereof, a coil spring rising from the lid and being secured thereto through the medium of the brackets, a slotted extension formed on the receptacle, a bar having a bent end passing through the slot of the extension and being capable of movement in a vertical plane, a hasp pivotally secured to the free end of the bar and being adapted to receive the stud when the bar is in closed position, and said bar being engaged by the upper end of the spring as and for the purpose specified.

In testimony whereof I affix my signature.

HENRY CARL ZAUN.